(12) United States Patent
Dourra et al.

(10) Patent No.: US 7,344,477 B2
(45) Date of Patent: Mar. 18, 2008

(54) UP SHIFT CONTROL WITH OVERRUNNING CLUTCH

(75) Inventors: Hussein A Dourra, Bloomfield, MI (US); Teddy Siy, Royal Oak, MI (US); Javed Dada, Lapeer, MI (US); Ali M Mourtada, Dearborn Heights, MI (US)

(73) Assignee: Chrysler LLC, Auburn Hills, MI (US)

( * ) Notice: Subject to any disclaimer, the term of this patent is extended or adjusted under 35 U.S.C. 154(b) by 222 days.

(21) Appl. No.: 11/272,535

(22) Filed: Nov. 10, 2005

(65) Prior Publication Data

US 2007/0105692 A1 May 10, 2007

(51) Int. Cl.
*F16H 61/04* (2006.01)

(52) U.S. Cl. ..................................... 477/143

(58) Field of Classification Search ............ 477/127, 477/138, 143; 475/118, 120, 121, 122, 127, 475/904; 192/48.6
See application file for complete search history.

(56) References Cited

U.S. PATENT DOCUMENTS 5,113,722 A * 5/1992 Iizuka ..................... 477/119
5,235,877 A * 8/1993 Takahashi et al. .......... 477/123
6,149,548 A * 11/2000 Holbrook et al. .......... 477/155
7,179,189 B2 * 2/2007 Dourra et al. .............. 475/123

* cited by examiner

*Primary Examiner*—Roger Pang
(74) *Attorney, Agent, or Firm*—Ralph E. Smith

(57) ABSTRACT

An automatic transmission for a vehicle includes a multi-plate clutch having an applied state and a released state and an overrunning clutch having an engaged state and an overrunning state. In addition, the transmission includes a controller that effectuates a gear shift of the transmission by applying a volume of fluid to the multi-plate clutch to toggle the multi-plate clutch from the released state to the applied state at approximately the same time the overrunning clutch is toggled into the overrunning state. The applied volume of fluid at which the multi-plate clutch is applied is substantially given by the following equation:

$$V_F = V_L - (k*T)$$

where $V_F$ is the volume, $V_L$ is the instantaneous volume at any time, k is a constant, and T is the input torque to the transmission.

13 Claims, 3 Drawing Sheets

| GEAR | RATIO | \multicolumn{8}{c}{ELEMENTS APPLIED} |
| | | A | B | C | D | E | F | G | H |
|---|---|---|---|---|---|---|---|---|---|
| 1 | 4.127 | X | | | | X | X | | X |
| 2 | 2.842 | X | | | | X | | X | |
| 3 | 2.284 | X | | | X | | X | | X |
| 4 | 1.452 | X | X | | | | X | | X |
| 5 | 1.000 | X | X | | | | | X | |
| 6 | 0.689 | | X | | X | | | X | |
| R | 3.215 | | | X | | X | X | | |

FIG 2

UP SHIFT CONTROL WITH OVERRUNNING CLUTCH

FIELD OF THE INVENTION

The present invention relates to transmissions and more particularly to a six-speed transmission incorporating a 1-2 shift control scheme based on fill pressure adaptation.

BACKGROUND OF THE INVENTION

Generally, conventional automatic transmissions include a torque converter to transfer engine torque from an engine to an input of the transmission, planetary gearsets that provide various gear ratios of torque and thus various drive speeds, and fluid pressure-operated, multi-plate drive or brake clutches and/or brake bands that are connected to the individual elements of the planetary gearsets in order to perform gear shifts between the various gear ratios.

In addition, conventional automatic transmissions include one-way clutches (i.e., overrunning clutches) that cooperate with the multi-plate clutches to optimize power shifts and a transmission controller for selectively applying and releasing elements to shift the gears. For example, the controller chooses the proper gear depending on system conditions such as the shift-program selected by the driver (i.e., Drive, Reverse, Neutral, etc.), the accelerator position, the engine condition, and the vehicle speed.

As an accelerator is further depressed, and the vehicle increases speed, the controller disengages appropriate clutches to sequentially shift up through each of the gears until the highest gear is engaged. Specifically, the controller initiates a "single swap" event that releases an engaged clutch and applies an idle clutch such that a shift from a lower gear to a higher gear is accomplished. As can be appreciated, as the releasing clutch loses capacity, the applying clutch picks up capacity simultaneously such that a driver does not notice or feel the gear shift.

Once the highest gear is engaged, further depression of the accelerator will cause the controller to operate another single swap event such that a lower gear is chosen, and a requisite torque is supplied by the transmission. In this manner, the controller will downshift through the gears sequentially, each time applying and releasing a single pair of clutches to perform the requisite gear shift.

Conventional shift sequences adequately shift between respective gears of a transmission by applying and releasing a single pair of multi-plate clutches, as previously discussed. However, when shifting from an overrunning clutch to a multi-plate clutch, a smooth transition generally depends solely on the applying element. Ideally, when the multi-plate clutch is applied, torque will be dropped off the overrunning clutch and transferred to the applying clutch to achieve a smooth transition between gears. However, timing application of the multi-plate clutch is often a difficult task for conventional transmissions and transmission controllers.

Therefore, a transmission capable of timing the application of a multi-plate clutch following release of an overrunning clutch to effectuate a smooth gear shift is desirable in the industry. Furthermore, a transmission capable of learning a fill volume for an applying multi-plate clutch assembly to time the application of the multi-plate clutch assembly with the release of an overrunning clutch is also desirable.

SUMMARY OF THE INVENTION

An automatic transmission for a vehicle includes a multi-plate clutch having an applied state and a released state and an overrunning clutch having an engaged state and an overrunning state. In addition, the transmission includes a controller that effectuates a gear shift of the transmission by applying a volume of fluid to the multi-plate clutch to toggle the multi-plate clutch from the released state to the applied state at approximately the same time the overrunning clutch is toggled into the overrunning state. The applied volume of fluid at which the multi-plate clutch is applied is substantially given by the following equation:

$V_F = V_L - (k*T)$ at $X$(see FIG. 3)

where $V_F$ is the volume, $V_L$ is the instantaneous volume at any time, k is a constant, T is the input torque to the transmission, and X is defined as the point where speed change starts. Speed change is defined as Nt<Ni−40 rpm
Nt=Turbine Speed
Ni=Output speed*Current Gear Ratio
For Ratios see FIG. 2.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table showing gear ratio combinations and shift sequences for the transmission of FIG. 1.

DETAILED DESCRIPTION OF THE PREFERRED EMBODIMENTS

Figure 1:
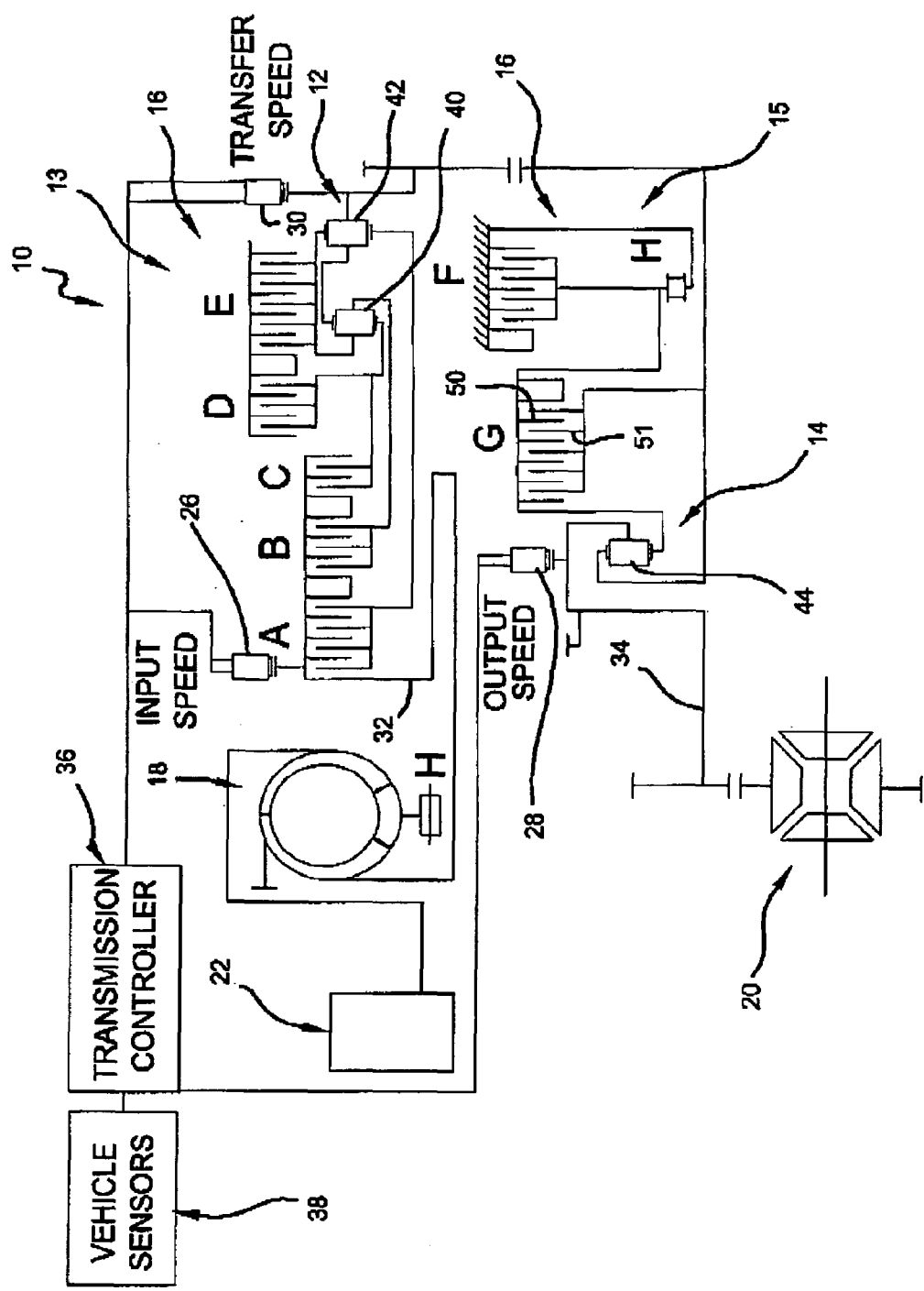
FIG. 1 is a schematic representation of a transmission in accordance with the principals of the present invention.

The following description of the preferred embodiment(s) is merely exemplary in nature and is in no way intended to limit the invention, its application, or uses.

With reference to the figures, a transmission 10 is shown having a main gear set 12 disposed in a main box 13 of the transmission 10, a compounder gear set 14 disposed in an under drive assembly 15 of the transmission 10, and a series of engagement elements 16. The engagement elements 16 selectively engage respective gears of the main gear set 12 and compounder gear set 14 to provide the transmission 10 with an optimum gear ratio, as will be discussed further below.

With particular reference to FIG. 1, the transmission 10 is shown operably connected to a torque converter 18 and a differential 20. The torque converter 18 is a fluid coupling between a power plant 22, such as, but not limited to, a combustion engine and the transmission 10 and serves to transmit a rotational force from the power plant 22 to the transmission 10. The rotational force received from the power plant 22 via torque converter 18 is then used to drive a combination of the main gears 12 and/or compounder gears 14 to provide a desired output of the transmission 10. The output of the transmission 10 is received by the differential 20 for use in driving one or more wheels of a vehicle (not shown) at a desired acceleration and speed.

The transmission 10 further includes an input sensor 26, an output sensor 28, and a transfer sensor 30 that monitor operating conditions of the transmission 10. The input sensor 26 monitors a rotational speed of an input shaft 32, which is generally indicative of the rotational speed of an output of the torque converter 18, while the output sensor 28 serves to monitor a rotational speed of an output shaft 34 of the transmission 10. The transfer sensor 30 monitors a speed of rotation of an output of the main gears 12 for use in determining which of the compounder gears 14 to engage to optimize transmission output, as will be discussed further below.

Each of the sensors 26, 28, 30 are connected to a transmission controller 36 and provide the controller 36 with operating conditions of the transmission 10. The transmission controller 36 uses the operating data in conjunction with vehicle data received from vehicle sensors 38 in an effort to determine an optimum gear ratio for the transmission 10. Vehicle sensors 38 monitor vehicle speed and operator inputs, such as braking and acceleration. Selection of the optimum gear ratio provides the differential 20 with an appropriate input via output shaft 34, and thus, enhances the performance of a vehicle to which the transmission 10 may be tied. While the vehicle sensors 38 are described as monitoring vehicle speed, braking, and acceleration, it should be understood that such parameters are exemplary in nature and are therefore not limited as such. Other vehicle operating parameters having bearing on transmission gear selection such as braking and wheel speed are considered within the scope of the present teachings.

The controller 36 adjusts the engagement elements 16 to selectively apply different gears from the main and compounder sets 12, 14 to provide the transmission 10 with an optimum output. As will be described further below, the controller 36 compares current operating conditions of the transmission (i.e., data received from sensors 26, 28, 30) with current vehicle operating conditions (i.e., data received from vehicles sensors 38) to determine an optimum gear ratio, and thus, an optimum transmission output.

The main gear set 12 includes a first and second planetary gear sets 40, 42 while the compounder gear set 14 includes a third planetary gear set 44, as best shown in FIG. 1. The planetary gears 40, 42, 44 provide the transmission 10 with six different gears and a reverse gear. The engagement elements 16 include a series of individual clutches A-G and an additional "overrunning" clutch H disposed in the under drive assembly 15, which are selectively engaged to provide the transmission 10 with a number of different gear ratios. Specifically, the controller 36, based on current operating conditions of the vehicle and the transmission 10, selectively applies respective clutches A-H to engage varying combinations of planetary gears 40, 42, 44 to provide a desired output gear ratio of the transmission 10.

As best shown in FIG. 2, clutches F and H are seemingly applied at the same time to achieve respective gears. However, it should be understood that clutch H is a so-called "overrunning" clutch and is used when the transmission 10 experiences a positive torque. Conversely, when the transmission 10 experiences negative torque, clutch F is required to provide a desired ratio and the overrunning clutch H is overrunning.

Figure 3:
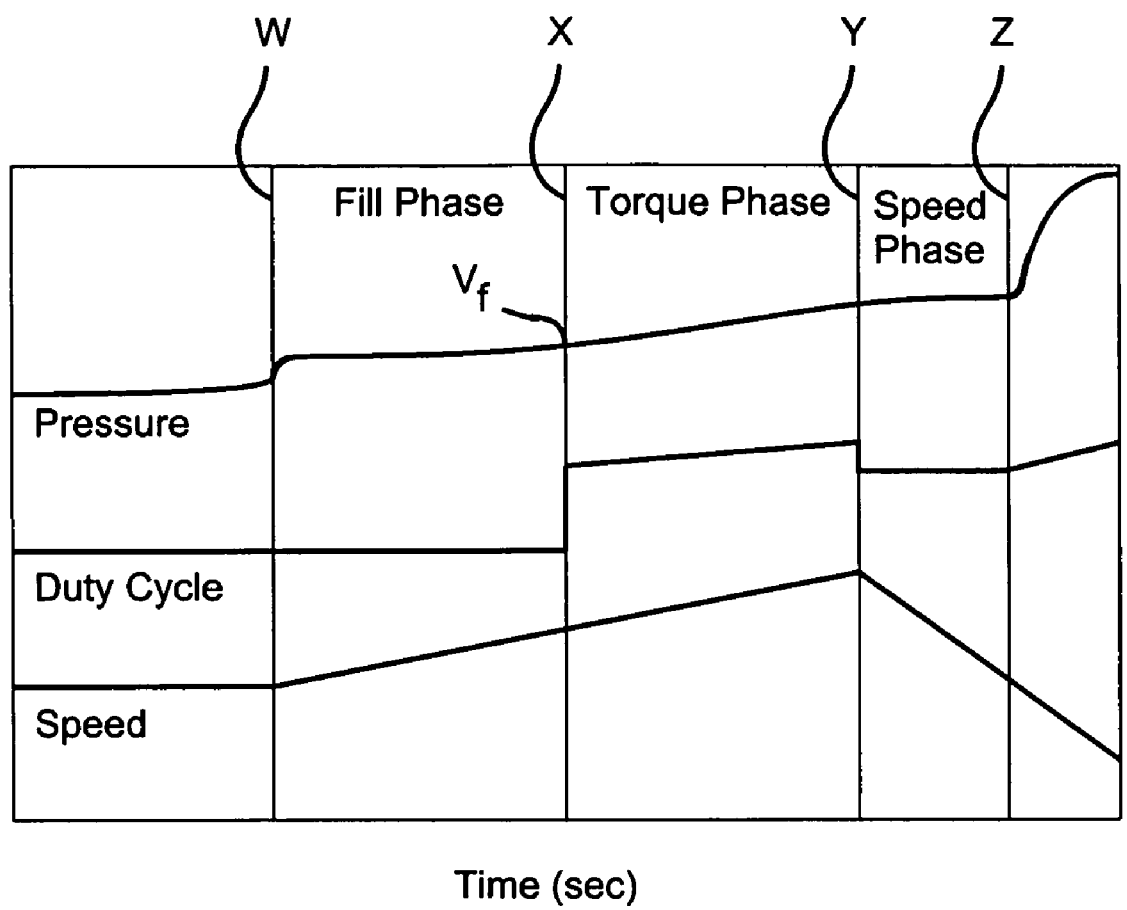
FIG. 3 is a graphical representation of a shift sequence from an overrunning clutch to a multi-plate clutch showing applied pressure, fill volume, and speed curves.

With reference to FIGS. 2-3, the operation of the transmission 10 will be described in detail. When the vehicle is at idle, the torque converter 18 freely spins without transmitting a rotational force to the transmission 10 from the power plant 22 (i.e., in a braked or neutral condition). However, once enabled and in a drive mode, a user depresses an accelerator (not shown), and the vehicle sensor 38 sends a signal indicative thereof to the transmission controller 36. As shown in FIG. 2, the controller 36 engages clutch A, E, and (F or H) so that the lowest, or first gear combination 1, is selected (each selection represented by an "X" in FIG. 2). The lowest gear 1 includes the highest gear ratio (i.e., 3.9), and thus, provides the vehicle with the most torque. As can be appreciated, a higher torque value is desirable in that it provides the vehicle with the greatest acceleration from a rest position.

When the transmission 10 is in gear 1, clutches A and E are applied and clutch H is engaged under a positive torque condition, as shown in FIG. 2. It should be noted that under a negative torque condition, when clutch H is overrunning, clutch F is applied to provide the transmission 10 with a desired ratio. When the controller 36 determines that an up shift is required, the controller 36 applies clutch G. To ensure a smooth shift from gear 1 to gear 2, the timing between release of the overrunning clutch H to the application of multi-plate clutch assembly G should be controlled, as will be discussed further below.

FIG. 3 depicts the rate and level of pressure applied to clutch G from the onslaught of the shift sequence through completion of the shift as well as the corresponding output speed of the transmission 10. The gear shift between gears 1 and 2 is divided into three phases, including a fill phase beginning at point "W", a torque phase beginning at point "X", and a speed phase beginning at point "Y." During the fill phase, clutch G experiences an increase in pressure in an effort to bring clutch G capacity to the level where it can pickup torque and forces a speed change. Specifically, clutch G experiences an increasing volume of hydraulic fluid within clutch G such that plates 50, 51 within the clutch G move closer together.

When the plates 50, 51 of clutch G are sufficiently close to one another, clutch G begins to pick up torque, the overrunning clutch H at that point will overruns and therefore carries no torque. The key to a successful gear shift between gears 1 and 2 is ensuring that a fill volume $V_F$ of hydraulic fluid applied to clutch G is sufficient, in order to predict the fill volume the following equation should be executed:

$$V_F = V_L - (k*T) \text{ at speed change}$$

Where speed change is defined as:

Nt<Ni−40 rpm

Nt=Turbine Speed

Ni=Output speed*Current Gear Ratio

For Ratios see FIG. 2.

T=T is the input torque to the transmission $V_F$=Predicted Fill volume, $V_L$=Instantaneous volume at any time, k=Constant $V_L$ is calculated using the following equation:

$$V_L = t*Q$$

t=time

Q=Flow constant. These constants are a function of hydraulic circuit design

The equation $V_F = V_L - (k*T)$ will predict the value of $V_F$ by latching the value of $V_L$ at speed change.

In the above equation, the term $(k*T)$ is bounded by lower and upper limit. The quation shown above is used when input torque is between 45-85 NM.

The lower limit is chosen based on system response at low torque application. With input torque is low (idle torque), the inescapable torque drop is very small and therefore detection of speed change becomes uncertain and errors could occur. Therefore the lower limit of 45NM was chosen, it has enough inescapable torque drop so we can detect it and latch a valid $V_F$ value as described in the following relationship $T_{inesacpable}$ is proportional to $\delta T * \delta(Inertia*\alpha)$ Where $\delta T$=change in input torque
$\alpha$=Turbine acceleration
$\delta(Inertia*\alpha)$=change in acceleration
$T_{inescapable}$=Inescapable torque drop during torque phase of the shift see FIG. 3)

The upper limit of 85NM is chosen based on
1) Torque curve linearity
2) System calibration With particular reference to FIG. 3, an exemplary shift sequence from gear 1 to gear 2 will be described in detail. When the transmission 10 is in gear 1, clutches A and E are applied and clutch H is engaged under a positive torque condition, as shown in FIG. 2. At this point, the pressure applied to clutch G is essentially zero, as indicated by the pressure plot of FIG. 3. When the transmission controller 36 determines that an up shift is required, based on data received from the vehicle and transmission sensors 38, 26, 28, 30, the controller 36 initiates a gear shift, thereby causing an increase in pressure to plates 50, 51 of clutch G.

When the controller 36 initially increases the pressure applied to clutch G, the shift from gear 1 to gear 2 begins the "fill" phase (represented between points "W" and "X" in FIG. 3). During the fill phase, clutch H is engaged and driving the output 34 of the transmission 10 as hydraulic fluid pressure is applied to clutch G at a steadily increasing rate. To effectuate a smooth shift, clutch G must be ready to drive the transmission 10 at the instant clutch H is overrunning, as previously discussed. Therefore, the transition between the fill phase and a torque phase (i.e., when clutch G begins to drive the transmission 10) must be properly timed.

Generally speaking, the fill volume $V_F$ dictates the point at which the shift transforms from the fill phase to the torque phase, as best shown in FIG. 3. The fill volume $V_F$ is determined according to the following equation:

$V_F = V_L - (k*T)$ at speed change

The fill volume $(V_F + K*T)$ corresponds to the point at which the overrunning clutch H releases and the multi-plate clutch G is able to drive the output 34 of the transmission 10. At this point (i.e., at the fill volume $V_F$), the fill phase transitions into the torque phase (i.e., between points "X" and "Y") such that clutch G is driving the transmission 10. If the fill volume $V_F$ satisfies the above equation, the transition between the release of the overrunning clutch H and the application of clutch G should be properly timed.

During the torque phase, the pressure applied to clutch G is steadily increased at a specific rate. The rate of application of hydraulic fluid to clutch G is generally referred to as the change in solenoid duty cycle. The duty cycle refers to the opening and closing of a solenoid (not shown) to allow more or less fluid to be applied to clutch G. In this manner, duty cycle is generally proportional to clutch pressure. The initial duty cycle during the torque phase is determined and adapted by the following equations:

If $t \leq t*$ decrease the initial duty cycle

If $t > t*$ increase the initial duty cycle t=the time it takes from X to Y (FIG. 3)

$t*$=the desired time from X to Y, this time is a table calibrated to be a function of input torque.

Another method can be used to adjust the initial value of the torque phase. The duty cycle is adjusted based on the value of a "jerk" term, as given by the following equation:

Jerk=Change in Acceleration/Change in Time

An increase in duty cycle translates into an increase in pressure applied to the clutch G. The increase in pressure applied to clutch G gradually causes plates 50, 51 of clutch G to move closer and closer together until finally the plates 50, 51 are rotating together at the same speed. The relationship between a duty cycle increase and a pressure increase is highlighted in FIG. 3, which shows an increase in pressure (i.e., an increase in duty cycle) between points "X" and "Y." The duty cycle is reduced once the torque phase transitions into the speed phase as the pressure required to hold plates 50, 51 together is not as great as the pressure required to bring the plates 50, 51 together. Once the shift enters the speed phase, the clutch G is driving the output 34 of the transmission 10.

Wherein the change in time is determined following the start of the speed change phase and the change in time is measured for a predetermined interval, such as, for example, 50 to 100 milliseconds following the speed change (i.e., following point "Z" of FIG. 3). As can be appreciated, if the jerk term is high such that the speed change occurs over a very short period of time, vehicle occupants will likely feel a "jerking" sensation as the vehicle shifts between gears. Conversely, if the jerk term is very low, the vehicle will likely feel sluggish and unresponsive. The controller 36 monitors the shift from gear 1 to gear 2 by monitoring the jerk term. If the jerk term is too high, the change in acceleration is very high over a short period of time. In this situation, the controller 36 reduces the duty cycle rate during the torque phase for a subsequent shift. If the jerk term is too low, such that the change in acceleration is very slow over a long period of time, the controller 36 increases the duty cycle rate during the torque phase for a subsequent shift. The reduction in duty cycle causes the torque phase to lengthen as the time required for clutch G to fully engage becomes longer due to the decrease in pressure. On the other hand, the increase in duty cycle causes the torque phase to shorten as the time required for clutch G to fully engage becomes shorter due to the increase in pressure. Therefore, adjusting the duty cycle based on the jerk term provides the transmission 10 with the ability to alter transmission output and provide improved shift performance.

When the torque phase transitions into the speed phase (i.e., between points "Y" and "Z" in FIG. 3), the duty cycle rate (i.e., the rate of hydraulic fluid applied to clutch G) is reduced to a level required to achieve a desired rate of deceleration. This rate is a function of turbine speed and input torque. The initial duty cycle during speed change is determined and calculated as follows:

$$\text{If } \frac{\sum_{1}^{8} \text{Duty Cycle}}{8} \leq \text{Initial Duty Cycle Increase the initial duty cycle}$$

$$\text{If } \frac{\sum_{1}^{8} \text{Duty Cycle}}{8} > \text{Initial Duty Cycle decrease the initial duty cycle}$$

A good shift control is characterized by a constant increase in pressure which translated into a constant duty cycle. This equation above forces such control.

In addition to adjusting the rate of the duty cycle, the controller 36 can also adjust the initial value of the duty cycle to adjust an initial pressure applied at the beginning of the torque phase. Specifically, the controller 36 can adjust the initial duty cycle value to either increase or decrease the starting point of the duty cycle based on the jerk term (i.e., the rate of acceleration over time). Therefore, if the jerk term is too high, the controller 36 can reduce the initial pressure in conjunction with reducing the rate of duty cycle for a subsequent shift during the torque phase applied at the onslaught of the torque phase through a reduction in the initial starting point of the duty cycle. Conversely, the controller 36 can increase the initial pressure in conjunction with increasing the rate of duty cycle for a subsequent shift during the torque phase applied at the onslaught of the torque phase through an increase in the initial starting point of the duty cycle if the jerk term is too low.

By properly setting the fill volume VF based on the above-mentioned equation (i.e., $V_F=V_L-(k*T)$) and by adjusting the duty cycle during the torque phase based on the rate of acceleration over time (i.e., the jerk term), the controller 36 is able to properly time the application of multi-clutch G and monitor and tailor the torque phase to provide a smooth and consistent shift.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automatic transmission for a vehicle comprising:
a first engagement element operable between an applied state and a released state;
a first overrunning engagement element operable between an engaged state and an overrunning state;
a controller operable to effectuate a gear shift of the transmission by applying a volume of fluid to said first engagement element to toggle said first engagement element from said released state to said applied state at approximately the same time said first overrunning engagement element is toggled into said overrunning state,
wherein said applied volume of fluid at which said first engagement element assumes its applied state substantially satisfies the following equation:

$$V_F=V_L-(k*T)$$

where $V_F$ is said volume, $V_L$ is the instantaneous volume at any time, k is a constant, and T is the input torque to the transmission.

2. The automatic transmission of claim 1, wherein the term (k*T) is substantially equal to zero if the input torque is less than 60 Nm.

3. The automatic transmission of claim 1, wherein said first engagement element is a multi-plate clutch assembly.

4. The automatic transmission of claim 1, wherein said overrunning engagement element is an overrunning clutch.

5. A method for controlling operation of an automatic transmission of a vehicle comprising:
engaging an overrunning clutch to drive an output of the transmission;
sensing vehicle and transmission operating conditions;
initiating a shift from a first gear to a second gear based on said operating conditions;
calculating a fill volume, said fill volume a minimum volume required to shift from said first gear to said second gear;
applying fluid pressure to a first multi-plate clutch until reaching said fill volume;
overrunning said overrunning clutch once said fill volume is achieved;
applying fluid pressure at an increasing rate to said multi-plate clutch once said fill volume is achieved until said multi-plate clutch is fully applied; and
maintaining a substantially constant fluid pressure on said multi-plate clutch until a desired output speed is achieved.

6. The method of claim 5, wherein said fill volume is substantially given by the following equation:

$$V_F=V_L-(k*T)$$

where $V_F$ is said fill volume, $V_L$ is the instantaneous volume at any time, k is a constant, and T is the input torque to the transmission.

7. The method of claim 6, wherein the term (k*T) is substantially equal to zero if the input torque is less than 60 Nm.

8. The method of claim 5, wherein an initial rate of fluid pressure applied to said multi-plate clutch upon reaching said fill volume is substantially equal to a rate of fluid pressure experienced during a previous shift when said multi-plate clutch is fully engaged.

9. The method of claim 5, wherein constant fluid pressure is increased once said desired output speed is achieved.

10. A method for controlling operation of an automatic transmission of a vehicle comprising:
engaging an overrunning clutch to drive an output of the transmission;
sensing vehicle and transmission operating conditions;
initiating a shift from a first gear to a second gear based on said operating conditions, said shift including a fill phase, a torque phase, and a speed phase;
applying fluid pressure at a first rate to a first multi-plate clutch during said fill phase;
overrunning said overrunning clutch once completing said fill phase and achieving a predetermined volume of fluid acting on said multi-plate clutch;
initiating said torque phase upon reaching said predetermined volume of fluid;
applying fluid pressure at a second rate to said multi-plate clutch during said torque phase, said second rate initially equal to an initial rate during said speed phase from a previous shift;
reducing said second rate once said torque phase is complete;
initiating said speed phase; and applying fluid pressure at a third rate to maintain engagement of said multi-plate clutch during said speed phase.

11. The method of claim 10, wherein said predetermined volume is substantially given by the following equation:

$$V_F = V_L - (k*T)$$

where $V_F$ is said fill volume, $V_L$ is the instantaneous volume at any time, k is a constant, and T is the input torque to the transmission.

12. The method of claim 11, wherein the term (k*T) is substantially equal to zero if the input torque is less than 60 Nm.

13. The method of claim 10, wherein said second rate is substantially equal at the beginning and at the end of the torque phase.

* * * * *